United States Patent Office 2,710,799
Patented June 14, 1955

2,710,799

RECOVERY OF PLATINUM FROM ALUMINA BASE PLATINUM CATALYST

James Glenn Leopard, Shreveport, La., assignor to Universal Polychem Company, Shreveport, La., a corporation of Delaware No Drawing. Application August 11, 1953,
Serial No. 373,690

12 Claims. (Cl. 75—121)

This invention relates to an improved method for recovering platinum from catalysts having platinum associated with refractory compounds, such as alumina, magnesia, zinc oxide, silica, etc., as well as mixtures of two or more of these refractory compounds, such as alumina-magnesia, alumina-silica, etc., and such catalysts having been prepared for use in chemical or hydrocarbon conversion processes.

There are various types of platinum-containing catalysts which are produced by compounding or supporting the platinum with at least one other compound. The catalysts are generally manufactured into a powdered or pelleted form suitable for use in a processing reaction chamber or tubular reaction zone where the catalyst will be contacted with a reactant stream to effect a conversion such as hydrogenation, cyclization, hydrocracking, reforming, or like operation for which the particular platinum catalyst has been found particularly valuable. In such contacting operations the usual catalytic material is eventually deactivated or contaminated with a carbonaceous material so that it must be regenerated or replaced in the catalyst-containing chamber. Regenerating procedures usually comprise an oxidization or burning operation which will effect the removal of the contaminating matter from the catalyst. However, even though regeneration is employed to prolong the useful life of the catalyst, it is generally found that all or a part of the catalyst must eventually be discarded and replaced with freshly manufactured material.

It is, therefore, a principal object of the present invention to provide improved means for recovering the valuable platinum from a catalyst, particularly where the material comprises a refractory metal oxide supporting platinum as the activating material or as a part of the activating material.

It is also an object of the present invention to provide means for effecting the removal of platinum from refractory metal oxide base-platinum catalyst which has been substantially deactivated by a carbonaceous deposit.

The catalysts that are used in hydrocarbon conversion processes are generally subjected to high temperatures at several stages. During the manufacture of catalysts the refractory metal oxide base is usually subjected to a high temperature calcination before or after compositing with the platinum. The calcination temperatures usually lie within the range of from about 600° F. to about 1600° F. When being used in the catalytic reaction, the catalyst is also subjected to high temperatures of from about 600° F. to about 1050° F. As hereinbefore mentioned, the catalyst may also be regenerated by an oxidizing or burning operation. For most platinum-containing catalysts the preferred upper temperature limit during regeneration is about 1200° F. While being subjected to one or more of these high temperatures "hot spots" frequently develop in the catalyst bed which exceed the temperature at which the bed of catalyst is to be maintained. When these "hot spots" develop there frequently is a change in the crystalline structure of the metal oxide base, and/or of the platinum, and/or of the association of the platinum with the metal oxide base. For example, when the catalyst comprises platinum and alumina, the alumina that is preferred is gamma alumina which is a specific crystalline structure of alumina. At temperatures of about 1500° F.–1600° F. and higher the gamma alumina changes over to alpha alumina, another specific crystalline structure of alumina. The alpha alumina is generally much less desirable as a catalyst or catalyst support than gamma alumina and further because of the structure of alpha alumina it is difficultly soluble in most of the reagents in which gamma alumina is soluble, and it is a specific purpose of this invention to provide a means for effecting the removal of platinum for a catalyst in which alpha alumina is present.

In one embodiment the present invention relates to a method of recovering platinum from a platinum-refractory metal oxide composite which comprises treating said composite with a reagent and forming a soluble compound of a portion of said refractory metal oxide, dissolving said soluble compound providing thereby a solution of said soluble compound, separating platinum and undissolved refractory metal oxide in a solid form from said solution, treating the latter with a strong base and forming a soluble compound of remaining refractory metal oxide, dissolving said last mentioned soluble compound and separating platinum in a solid form from the solution.

In a specific embodiment my invention relates to a method of recovering platinum from a composite containing platinum, gamma alumina and alpha alumina which comprises treating said composite with a reagent and forming a soluble compound of said gamma alumina, dissolving said soluble compound providing thereby a solution of said soluble compound, separating platinum and alpha alumina in a solid form from said solution, treating the latter with a strong base and forming a soluble compound of said alpha alumina, dissolving said last mentioned soluble compound providing thereby a solution of said compound and separating platinum in a solid form from said solution.

In acordance with the present invention the reagent comprises an acidic compound or acid such as sulfuric acid, hydrochloric acid, hydrofluoric acid, chlorosulfonic acid, fluorosulfonic acid, and the like which are capable of reacting with or dissolving a part of the oxide base and forming a soluble compound. Preferably sulfuric acid is employed in the operation.

It may be noted, that where hydrofluoric acid is used to dissolve certain of the compounds such as alumina, that ammonia is desirable to provide an alkaline solution to increase the solubility of the fluoride compound and to thus leave the platinum and undissolved alumina in a substantially colloidal state within the resulting solution. Where hydrochloric acid is employed as the reagent, it is preferably used in a substantially concentrated solution of about 37% HCl with heat being subsequently applied and water added to permit dissolving substantially all of the soluble compound that is formed from the base material.

In a preferred operation sulfuric acid is employed to dissolve the metallic oxide base with approximately 50% acid solution being desirable to effectively dissolve the alumina. However, sulfuric acid solution ranging from about 25% to about 60% sulfuric acid can be used.

The composite may be in a finely divided, ground or powdered state, or in a pill form, for the present recovery procedure is not dependent upon the form of the catalyst material. However, where the material is in a ground or powdered state, the reaction with the acid is generally violent and heat producing and should be maintained under control. The heat of reaction is desirable to aid in dissolving the metal oxide base and as the reaction continues additional heat may be supplied to the mixture with additional water being added to completely dissolve the resulting soluble compound as the reaction is completed. The liquid may be decanted off and more acid added to the remaining catalyst with heat and water being added to effect further dissolving of the metal oxide. The second or successive batches of solution may be added to the decanted solution and the entire mixture heated to a boiling state. When the catalyst contains alpha alumina as well as gamma alumina, this treatment will convert substantially all of the gamma alumina into a soluble compound, however, a substantial part of the alpha alumina will remain unreacted and will be present either as free alpha alumina and/or as alpha alumina associated with platinum.

The unreacted refractory metal oxide and platinum are then separated from the solution of the soluble compound in any suitable manner such as filtering, decantation, centrifugal separation, etc. Preferably the material is filtered under suitable pressure or vacuum filtering means. In some cases the filtrate may contain a fine precipitate in which case the first filtrate may be refiltrated through the filtering means after a layer of filter-cake has been built up in the recovery apparatus.

The recovery filter-cake is subjected to thorough washing with distilled water to remove substantially all of the dissolved compound and to provide a resulting material which is substantially platinum, carbon particles and unreacted or undissolved refractory metal oxide.

The platinum is frequently in a finely divided or colloidal form and the platinum may be precipitated by bubbling hydrogen sulfide through the hot colloidal solution to form a dark brown or black precipitate. The solution is subjected to the hydrogen sulfide treatment for a period sufficient to effect the substantially complete separation of all of the platinum. In some instances where the catalyst contains a high per cent of carbon, the addition of hydrogen sulfide as hereinbefore described may be unnecessary. In other words, the solution containing the dissolved metal compound, the undissolved refractory metal oxide, the colloidal platinum and displaced carbon particles in a substantial amount may be allowed to stand and to settle the latter. The carbon particles upon settling will carry down the colloidal platinum such that a substantially clear supernatant liquid may be decanted off leaving only a relatively small amount of solution with the precipitated material to be filtered. The platinum recovery procedure may then be as previously described with the filter-cake being recovered and dried and the carbon content ignited to provide a residue containing substantially all of the metallic platinum.

In all instances the platinum containing residue which contains platinum as well as undissolved or unreacted refractory metal oxide in a solid form is further treated with a strong base thereby forming a soluble compound of substantially all of the remaining refractory metal oxide.

In accordance with the present invention the unreacted refractory metal oxide and platinum in a solid form is treated with a strong base, preferably potassium hydroxide, and/or sodium hydroxide, and the like which are capable of reacting with the remaining oxide base and forming a soluble compound.

In the preferred operation potassium hydroxide and/or sodium hydroxide is employed to dissolve the metallic oxide base. The residue from the acid digestion step which contains the unreacted oxide and platinum is contacted with the base and the base is preferably in the solid form, that is not as the solution, and water is thereafter added. The mixture is stirred and heated and the temperature maintained near or at the boiling point of the mixture which will usually lie within the range of from about 140° F. to about 190° F. The base reacts with the previously unreacted refractory oxide and forms a soluble compound of the oxide. The liquid may be decanted off and more water and/or base added to the remaining catalyst with heat and water being added to effect further dissolving of the metal oxide. When the catalyst contains alpha alumina as well as gamma alumina, substantial portions of the alpha alumina will remain unreacted during the acid digestion step and in this base digestion step substantially all of the alpha alumina is converted to a soluble compound.

The platinum that is substantially free of refractory metal oxide is then separated from the solution of the soluble compound in any suitable manner as hereinbefore set forth for separating the unreacted refractory metal oxide and platinum from the solution of the soluble compound resulting from the acid digestion step. Further, the hydrogen sulfide treatment may also be used.

The base, while preferably mixed with the platinum sludge or residue as a solid, may also be used in concentrated solutions. Dilute solutions may also be used, however, they are not preferred in the step of the invention. In general acid and base concentrations over 10% are preferred. The temperatures employed during the acid and base digestion should be at or near the boiling point of the solution. Lower temperatures may be used, however, when lower temperatures are employed, increasingly longer periods of time are necessary to effect complete reaction.

In all instances the platinum residue which is recovered can be further purified by redissolving it in aqua regia, precipitating the platinum as a sulfide with the addition of hydrogen sulfide, refiltering, drying and oxidizing the residue to the metal.

The following examples illustrate the effectiveness of the present improved method of recovering platinum from a refractory metal oxide base catalyst.

*Example I*

A 50 gram portion of alumina base catalyst containing platinum is dissolved in 100 cc. of concentrated sulfuric acid which is diluted with 100 cc. of water with additional heat being supplied during the reaction period. Following the dissolving and reaction period, the solution is diluted to approximately 500 cc. by the addition of distilled water and the resulting diluted solution is heated to boiling. While the solution is maintained in the boiling state, hydrogen sulfide gas is bubbled into the solution until the latter is saturated and a dark brown precipitate formed within the solution. The coagulated platinum material together with carbon particles present on the original catalyst is filtered onto an ashless filter paper, washed with distilled water, dried and ignited at about 500° C. in a muffle type of furnace. A residue is recovered weighing 0.2205 gram which in turn is found to provide 62.7% metallic platinum, the balance of the residue being primarily undissolved alumina. The entire residue is mixed with 0.25 gram of sodium hydroxide and is placed in an iron vessel and 0.25 cc. of distilled water is added. The mixture is stirred, covered lightly and heated to boiling. The heating is continued for about nine hours with occasional stirring. When the mixture begins to dry out and solidify, more water is added to thin the mass and make it filterable. The entire solution is filtered onto an ashless filter paper, washed with distilled water, dried and ignited at about 500° C. in a muffle type of furnace. The residue is platinum substantially free of alumina.

*Example II*

A 50 gram portion of magnesia base catalyst containing 0.3% by weight of platinum is dissolved in concentrated hydrochloric acid with additional heat being supplied during the reaction period and water added in excess of that necessary to dissolve all of the magnesium chloride formed. As in Example I, the platinum is freed from the catalyst in a finely divided colloidal form suspended within the resulting solution and while the solution is maintained in a boiling state hydrogen sulfide gas is bubbled into the solution until saturated and a dark brown precipitate of platinum material formed. The coagulated platinum material together with carbon particles present on the catalyst sample is filtered onto an ashless paper. The recovered material is washed with distilled water, dried and ignited in an electric muffle type of furnace. A residue of 0.215 gram is about 66.3% platinum, the balance of the residue being primarily undissolved magnesia.

As in Example I, the residue is mixed with 0.25 gram of solid sodium hydroxide and 0.25 cc. of distilled water is added. The digestion and recovery of the platinum is further carried out in accordance with the procedure as outlined in Example I above.

The platinum recovery is of the order of 95% of that combined with the magnesia base.

*Example III*

A 50 gram sample portion of zinc oxide base catalyst having 0.25% of platinum is dissolved in hydrochloric acid and water and following the procedures of the other examples a residue of 0.143 gram is recovered. The residue is digested in 0.2 gram of potassium hydroxide and 0.2 cc. of distilled water and the platinum is recovered following the procedure of the other examples. The final recovered platinum is substantially free of unreacted zinc oxide base.

The foregoing examples serve to point out the efficient recovery obtained by the method of this invention. Economically sulfuric acid is a desirable acid to use in the process and likewise sodium hydroxide and potassium hydroxide are desirable bases, however, it is not intended to limit the operation to the use of these compounds only, for as hereinbefore noted, other acids and bases may be employed as the alumina solvent forming a soluble alumina compound and freeing the platinum.

It should also be noted that though the specification has been directed primarily to the recovery of platinum from catalyst comprising an association of platinum and alumina or other refractory metal oxide the method is applicable to other platinum containing catalysts which comprise an association of platinum and one or more other refractory oxides with alumina as long as the proper acids and bases are chosen.

I claim as my invention:

1. A method of recovering platinum from a platinum-refractory metal oxide composite which comprises treating said composite with a reagent and forming a soluble compound of a portion of said refractory metal oxide, dissolving said soluble compound providing thereby a solution of said soluble compound, separating platinum and undissolved refractory metal oxide in a solid form from said solution, treating the thus separated solid material with a strong base and forming a soluble compound of remaining refractory metal oxide, dissolving said last mentioned soluble compound and separating platinum in a solid form from the solution.

2. The method of claim 1 further characterized in that said oxide comprises alumina.

3. The method of claim 1 further characterized in that said reagent comprises sulfuric acid.

4. The method of claim 1 further characterized in that said base comprises potassium hydroxide.

5. The method of claim 1 further characterized in that said base comprises sodium hydroxide.

6. A method of recovering platinum from a composite containing platinum, gamma alumina and alpha alumina which comprises treating said composite with an acidic reagent and forming a soluble compound of said gamma alumina, dissolving said soluble compound providing thereby a solution of said soluble compound, separating platinum and alpha alumina in a solid form from said solution, treating the thus separated solid material with a strong base and forming a soluble compound of said alpha alumina, dissolving said last mentioned soluble compound providing thereby a solution of said compound and separating platinum in a solid form from said solution.

7. The method of claim 6 further characterized in that said reagent comprises sulfuric acid.

8. The method of claim 6 further characterized in that said base comprises potassium hydroxide.

9. The method of claim 6 further characterized in that said base comprises sodium hydroxide.

10. A method of recovering platinum from a composite containing platinum, gamma alumina and alpha alumina which comprises treating said composite with sulfuric acid and forming a soluble compound of said gamma alumina, dissolving said soluble compound in water providing thereby a solution of said soluble compound, separating platinum and alpha alumina in a solid form from said solution, treating the thus separated solid material with a strong base at a temperature of from about 140° F. to about 190° F. and forming a soluble compound of said alpha alumina, dissolving said last mentioned soluble compound in water providing thereby a solution of said compound and separating platinum in a solid form from said solution.

11. The method of claim 10 further characterized in that said base comprises potassium hydroxide.

12. The method of claim 10 further characterized in that said base comprises sodium hydroxide.

References Cited in the file of this patent

UNITED STATES PATENTS 2,662,861    Riblett et al. _____ Dec. 15, 1953